C. H. COVELL.
Wrench.

No. 197,253. Patented Nov. 20, 1877.

WITNESSES:
C. Clarence Poole
DeWitt C. Allen

INVENTOR:
Calvin H. Covell
per Atty A. H. Evans

UNITED STATES PATENT OFFICE.

CALVIN H. COVELL, OF STOCKTON, CALIFORNIA.

IMPROVEMENT IN WRENCHES.

Specification forming part of Letters Patent No. 197,253, dated November 20, 1877; application filed September 17, 1877.

*To all whom it may concern:*

Be it known that I, CALVIN H. COVELL, of Stockton, county of San Joaquin, and State of California, have invented an Improvement in Wrenches; and I do hereby declare the following to be a full, clear, and exact description thereof, reference being had to the accompanying drawing.

My invention consists in a novel arrangement for instantaneously setting the movable jaw of screw of monkey wrenches independent of the usual operating-screw.

It consists in mounting the movable jaw in such a manner that any considerable movement of the jaw can be quickly made to any point on the wrench-bar without the use of the nut and screw, in combination with a minor adjustment made by a nut and screw, all as hereinafter fully described.

Figure 1:
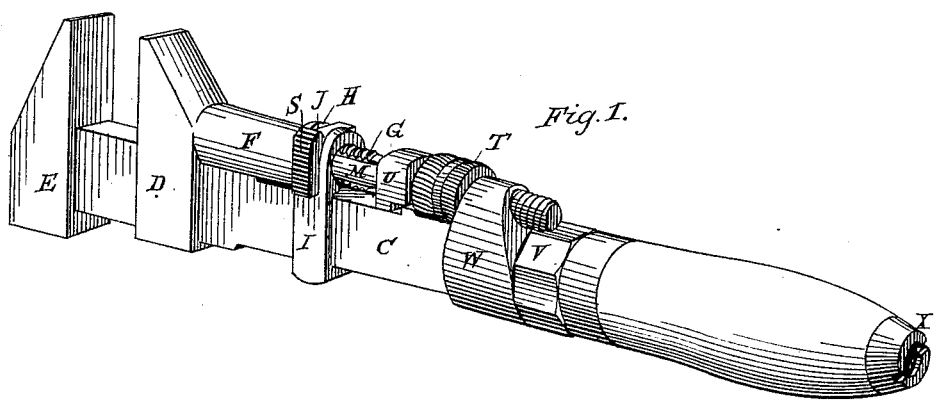
Figure 2:
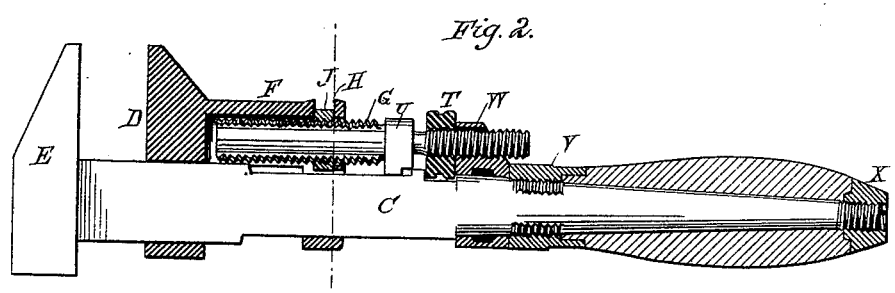
Figure 3:
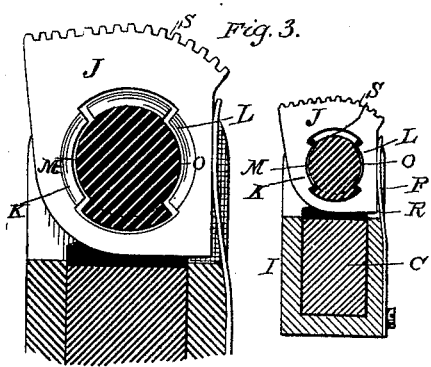
Figure 4:
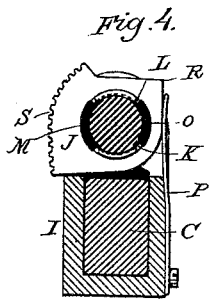

In the accompanying drawing, Figure 1 is a perspective view. Fig. 2 is a longitudinal section. Figs. 3 and 4 are transverse sections, showing the different positions of the screw J.

C is a wrench-bar, on which moves the jaw D. E is the outer fixed jaw. The inner jaw D is connected with a sleeve, F, which incloses one end of stem G. That portion of stem G which the sleeve F incloses has a screw-thread, which is cut away on opposite sides M O, leaving the thread on two opposite sides of the stem.

A slot, H, in the end of sleeve F and in encircling link I, contains a nut, J. This nut encircles the stem G, and is made with screw-threads on opposite sides, K and L, as shown in Fig. 3.

It will be obvious that when the threads on both nut J and stem G are in contact, or in the same line, the jaw D will be rigid and fixed on the stem, and when the threads K and L on the nut J are turned opposite the sides M and O of the stem, the jaw will move freely on it.

The spring P and the square corner R on the nut J prevent the nut from turning on the stem G unless desired, and its front face S is milled or rounded to give friction to the thumb in turning it.

The jaw D, when fixed on the stem G, is operated by a nut, T, and screw on the other end of stem G, in the usual manner. The stem G is prevented from turning by means of a guide-bar, U, which traverses the wrench-bar with the stem, and is fixed to the said stem.

When it is desired to open or close the jaws any considerable distance, the nut J can be turned, as shown in Fig. 3, so that the jaw will slide freely on the stem, and can be instantaneously placed near any desired point on the wrench-bar. The nut J can then be turned back, securing the jaw on the stem, and any minute adjustment made by means of the nut T and thread in the inner end of stem.

The ferrule V on the handle serves to unite the wrench-bar and handle, and to keep firmly in place the collar W, which guides and protects one end of stem G.

The ferrule is provided with a screw-thread on a portion of its inner surface, by which it is secured to the wrench-bar, having a screw-thread upon its outer surface, as shown in Fig. 2. The ferrule is, also, a portion of its length, made conical, and into it one end of the handle is forced, and held by a nut, *x*, on the end of the wrench-bar.

This form of ferrule is very strong, and is so constructed that it can be readily turned with any wrench, and this gives me a great advantage over ordinary wrenches, which are very difficult to dismount.

Having thus described my invention, what I claim, and desire to secure by Letters Patent, is—

1. The mutilated nut J, surrounding the stem G, and having the angular corner or stop R, in combination with the spring P, substantially as herein described.

2. The movable jaw D and sleeve F, with the nut J, in combination with the stem G, having the adjusting thread and nut T, the guide U, and bar C, substantially as herein shown and described.

In witness whereof I have hereunto set my hand and seal.

CALVIN H. COVELL. [L. S.]

Witnesses:
 JOHN WASLEY,
 ARTHUR M. NOBLE.